United States Patent [19]

Eiermann et al.

[11] Patent Number: 4,629,261

[45] Date of Patent: Dec. 16, 1986

[54] CENTERING AND SAFETY DEVICE FOR ROTORS SUPPORTED WITHOUT CONTACT

[75] Inventors: Albert Eiermann, Heddesheim; Dieter Glass, Sandhausen; Richard Herrmann, deceased, late of Ilvesheim, all of Fed. Rep. of Germany, by Helga Herrmann, heiress

[73] Assignee: Brown, Boveri & Cie AG, Mannheim-Käfertal, Fed. Rep. of Germany

[21] Appl. No.: 698,235

[22] Filed: Feb. 4, 1985

Related U.S. Application Data

[63] Continuation-in-part of Ser. No. 430,803, Sep. 30, 1982, abandoned.

[30] Foreign Application Priority Data

Oct. 22, 1981 [DE] Fed. Rep. of Germany ....... 3141841

[51] Int. Cl.⁴ ............................................. F16C 39/06
[52] U.S. Cl. .................................... 310/90.5; 310/90; 91/361; 251/30.01; 384/102; 384/448
[58] Field of Search ............................ 308/10; 310/90; 384/101, 102, 446, 448; 91/361, 459; 251/63.5, 30.01

[56] References Cited

U.S. PATENT DOCUMENTS

| | | | |
|---|---|---|---|
| 2,785,023 | 3/1957 | Naumann | 308/10 |
| 3,556,425 | 8/1963 | Carriere | 308/10 |
| 3,759,588 | 9/1973 | Anderson | 384/101 |
| 3,779,136 | 12/1973 | Hohlein | 91/361 |
| 4,043,612 | 8/1977 | Orcutt | 308/10 |
| 4,260,204 | 4/1981 | Hirt | 384/101 |
| 4,481,451 | 11/1984 | Kautz | 91/361 |
| 4,541,773 | 9/1985 | Drevet | 389/102 |
| 4,545,409 | 10/1985 | Luhmer | 251/30.01 |

FOREIGN PATENT DOCUMENTS

| | | |
|---|---|---|
| 2344230 | 3/1975 | Fed. Rep. of Germany ........ 308/10 |
| 2658925 | 6/1978 | Fed. Rep. of Germany ........ 308/10 |
| 2711065 | 9/1978 | Fed. Rep. of Germany ........ 308/10 |
| 2821177 | 11/1979 | Fed. Rep. of Germany ........ 308/10 |

*Primary Examiner*—R. Skudy
*Attorney, Agent, or Firm*—Herbert L. Lerner; Laurence A. Greenberg

[57] ABSTRACT

A safety and centering device for rotors suspended in contactless magnetic bearings, which provides almost instantaneous centering support for the rotor if the bearing magnets loose power. In a preferred embodiment, the rotor shaft has a collar with a conical friction surface, and a sleeve controlled by an electro magnet with counter-acting springs and also having a conical friction surface. In case of power failure the springs force the two surfaces together and provide centering support for the rotor. In another embodiment having a vertical rotor, the bearing magnets lift the rotor with the friction collar out of engagement with the matching stationary friction surface when the rotor is operating; but if the rotor bearings become de-energized the rotor drops with the collar falling into engagement with the matching friction surface.

10 Claims, 6 Drawing Figures

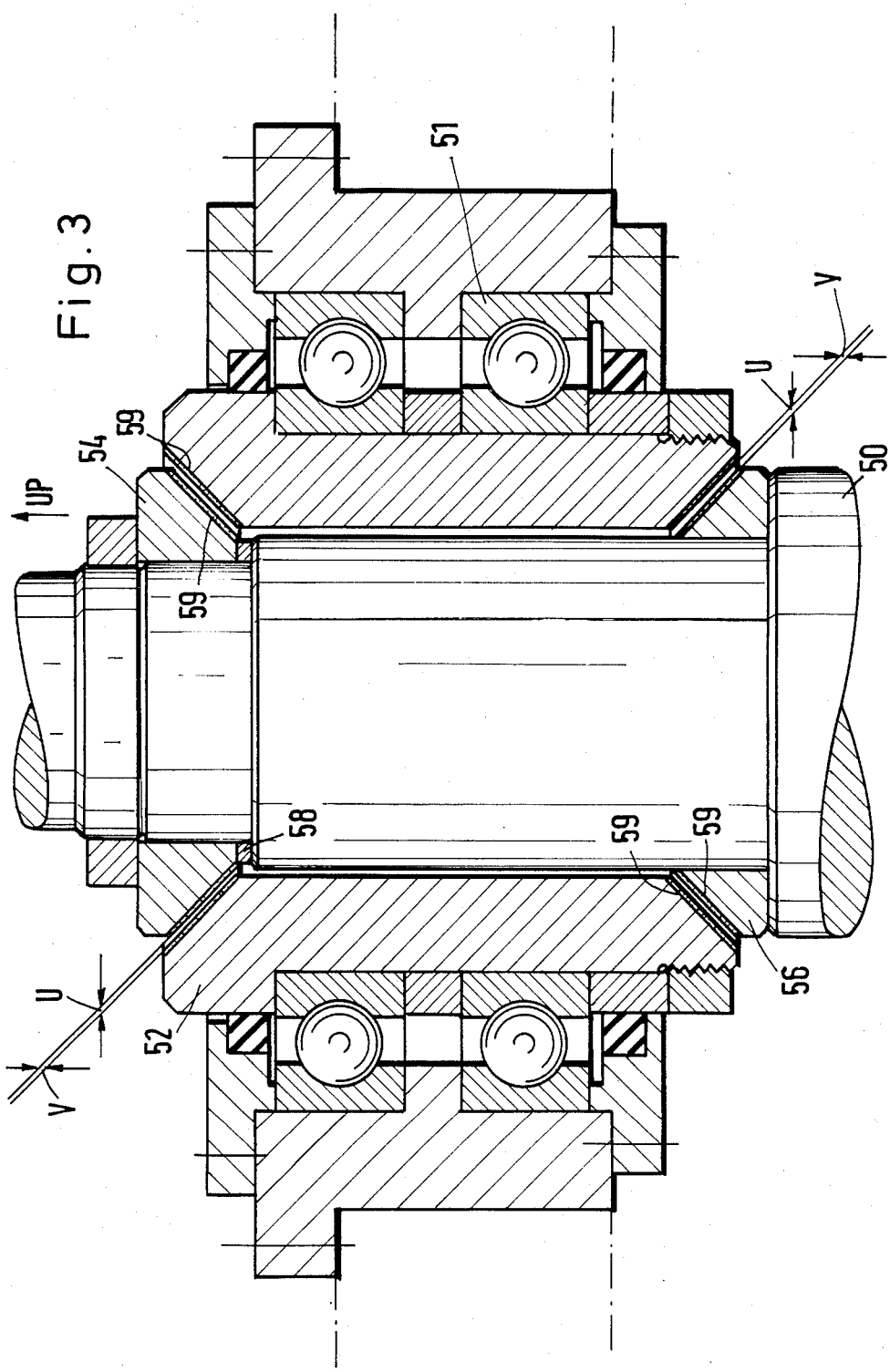

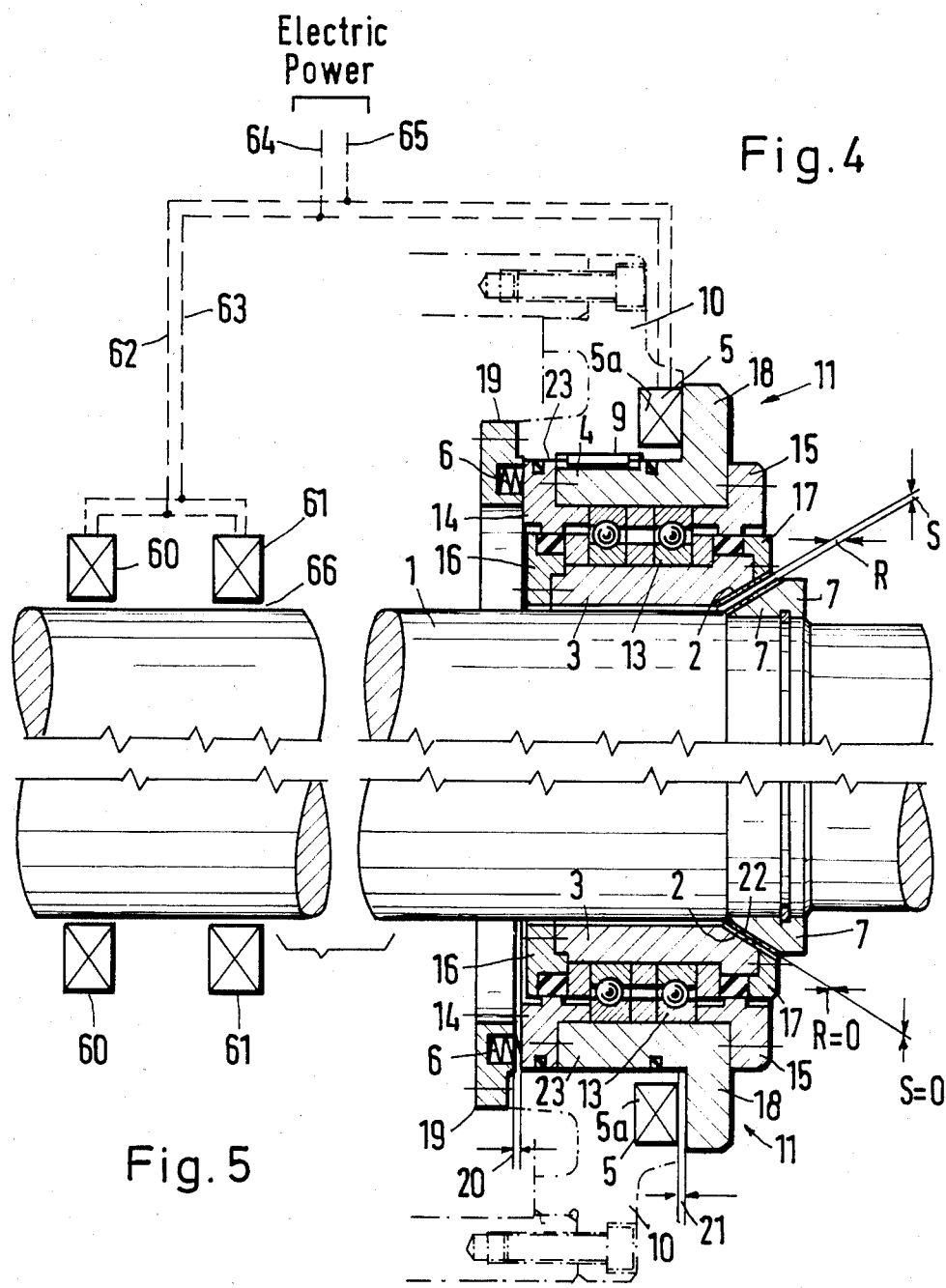

CENTERING AND SAFETY DEVICE FOR ROTORS SUPPORTED WITHOUT CONTACT

CROSS REFERENCE TO RELATED APPLICATION

This is a continuation-in-part of application Ser. No. 430,803, which was filed on Sept. 30, 1982, now abandoned.

BACKGROUND

The invention relates to a centering and safety device for rotors supported without contact, especially in magnetic bearings.

In known bearings systems of this type, uncontrollable radial motions of the rotor are unavoidable in vertically arranged rotors and if flexure-critical frequencies are traversed, due to the air gap present between the rotor shaft and the bearing. These motions cause vibrations of the rotor and can lead to considerable damage to the rotor bearings.

This is essentially the case in "emergency or damping safety bearings for high-speed or overcritically running rotors" according to the publications:

1. German Published, Prosecuted Patent Application No. DE-AS 2 658 925,
2. German Published, Non-Prosecuted Patent Application No. DE-OS 2 711 065, and
3. German Published, Non-Prosecuted Patent Application No. DE-OS 2 821 177.

The emergency bearing according to Publication No. 1, which is suitable only for the vertical, but not horizontal support of the rotor body, becomes effective only if a given shaft vibration amplitude is exceeded and thereby the required centrifugal force is generated, where only the latter reduces on its part the bearing play or the annular air gap (28) successively to zero. If, however, any damage or damage which does not result in the generation of a centrifugal force, occurs in a bearing still prior to this instant of becoming effective due to centrifugal force, then its above-mentioned adverse effects can at least not be precluded.

The safety and damping bearings according to Publications Nos. 2 and 3 are damping bearings which become effective only if radial rotor vibrations occur, the amplitudes of which are larger than the bearing gap itself which exists between the roof shaft and the bearing. The same applies here as said above, namely that shaft vibrations can cause uncontrollable and damaging stresses of all bearings due to centrifugal forces and vibration still before the extent of the gap is reached, i.e. still before the damping effect effect of the bearing is reached.

It is an object of the invention to provide by simple means a device of the type defined above, by means of which in horizontally as well as in vertically supported electrically energized magnetic bearings, a mechanical rotor support is provided which simultaneously provides centering in the event of trouble in one or all electrically energized magnetic rotor bearings, for instance, through loss of their carrying capacity, due to loss of electric power to the bearing magnets.

According to the invention, this problem of bearing damage, due to loss of carrying capacity is solved by providing a centering and supporting device in parallel to the electromagnetic rotor bearings and so that it forms a rotatable bearing sleeve which has at least one centering and bearing surface at an end face, so that the bearing bushing is brought into frictional support and centering contact with a corresponding annular area of a collar attached to the rotor in case the rotor should move axially in relation to the rotor shaft and the bearing sleeve.

In an advantageous further embodiment of the subject of the invention, there may be provided matching surfaces on both the bearing sleeve and on the rotor collar and that these surfaces are of annular and conical shape and that the bearing sleeve can be quickly moved and forced by fast-releasing elements with its bearing and centering surface axially against the bearing and centering surface of the collar of the rotor and wherein these elements include at least one electrically powered electromagnet ring acting against a flange of a sliding sleeve and therethrough against the force of springs acting on the sliding sleeve, the electro magnetic rotor bearings and the electromagnet ring of the centering and supporting device being electrically connected together, and that, finally, so that the bearing sleeve is supported in antifriction or sliding bearings which are fastened in a bearing housing, the latter being connected to a sliding sleeve.

The device according to the invention therefore has the substantial advantage that it goes into action simultaneously with failure, for instance, failure of the electric current supply for the bearing electro magnets, and takes over the support and centering of the rotor until the failure is corrected, without having to interrupt the running of the rotor or even to disassemble the bearings, so that unbalance vibrations and rotor vibrations cannot occur, whereby trouble-free uninterrupted operation is always ensured.

In the following, two embodiment examples of the subject of the invention will be described in greater detail, making reference to the attached drawing.

BRIEF DESCRIPTION OF THE DRAWINGS

FIG. 3 shows the safety and centering device in a second embodiment for vertically electromagnetically supported rotors.

FIGS. 4 and 5 are two complementary figures of the safety and centering device in the inactive and active condition, respectively, two of the electro magnetic rotor bearings being electrically connected in parallel with the electro magnet of the safety and centering device.

FIGS. 1 and 2 are two complementary figures that show the same rotor shaft 1 with a centering and safety device 11 built into a housing 10. The rotor bearings, are shown in FIGS. 4 and 5, and are contactless electro magnetic bearings and have in the normal operating condition, shown, a load-carrying air gap 66 which is larger that the radial annular gap "S" between the conical centering and bearing surfaces and the conical surface seen in FIG. 4, as described in more detail below and the axial annular gap "R".

Figure 1:
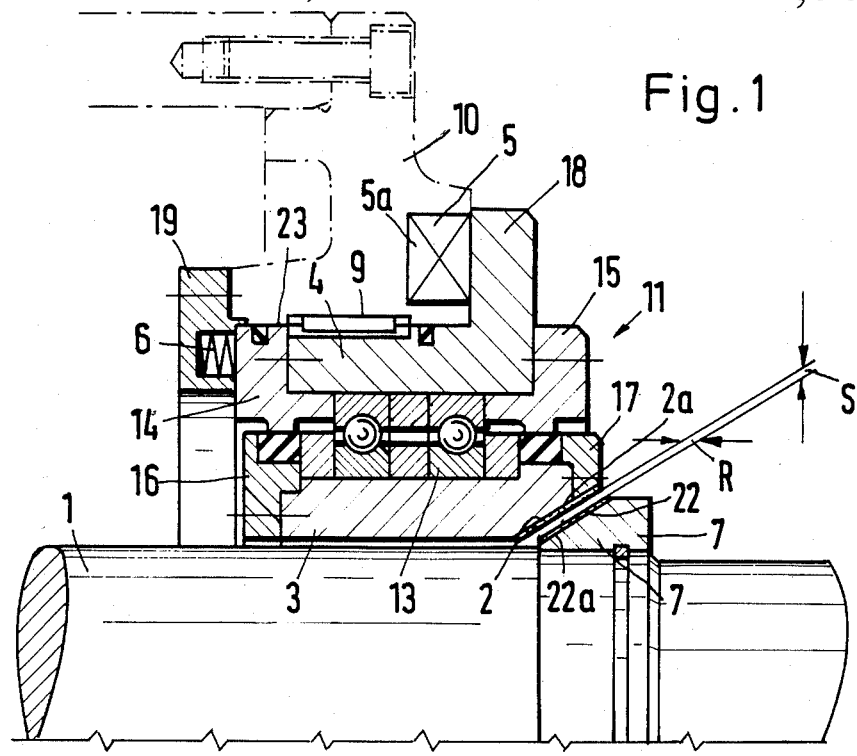
FIG. 1 shows a safety and centering device in a first embodiment for horizontally and vertically supported rotors, in the inactive state, with the bearing sleeve retracted.

The centering and safety device 11 consists essentially of a bearing sleeve 3 which is supported rotatably, in metallic bearings advantageously being ball bearings 13. The ball bearings 13 shown are held axially on the outside by two outer holding rings 14 and 15, the latter being bolted to a sliding sleeve 4. By means of two inner holding rings 16 and 17 which are bolted to the bearing sleeve 3, the bearing sleeve 3 together with the ball bearings 13 and the outer holding rings 14 and 15 as well as the sliding sleeve 4, forms the centering and safety device 11 which can slide axially relative to the rotor shaft 1 along the sliding surface 23 and is secured against rotation by one or several keys 9. In the normal operating condition of the rotor, i.e. in the inactive state of the centering and safety device 11 the latter is in the position shown in FIGS. 1 and 4, in which a flange 18 of the sliding sleeve 4 is attracted axially by a circular electromagnet ring 5 with the magnet coil 5a shown in cross section, built into the housing 10. Several individual magnets may alternatively be arranged at the sircumference instead of a single electromagnet ring 5. As a result of magnetic attraction, when the electromagnet ring 5 is energized the entire centering and safety device 11 is drawn axially against several compression springs 6 which are disposed, distributed at the circumference in holes in a plate 19 bolted to the housing 10, and press against this plate 19 proper.

In this inactive condition of the centering and safety device, there is a radial air gap "S" and an axial air gap "R" between the conical annular centering and bearing surface 2 of the bearing sleeve 3 and a corresponding matching conical surface 22 on the centering and bearing collar 7, which is fastened to the rotor shaft.

Figure 2:
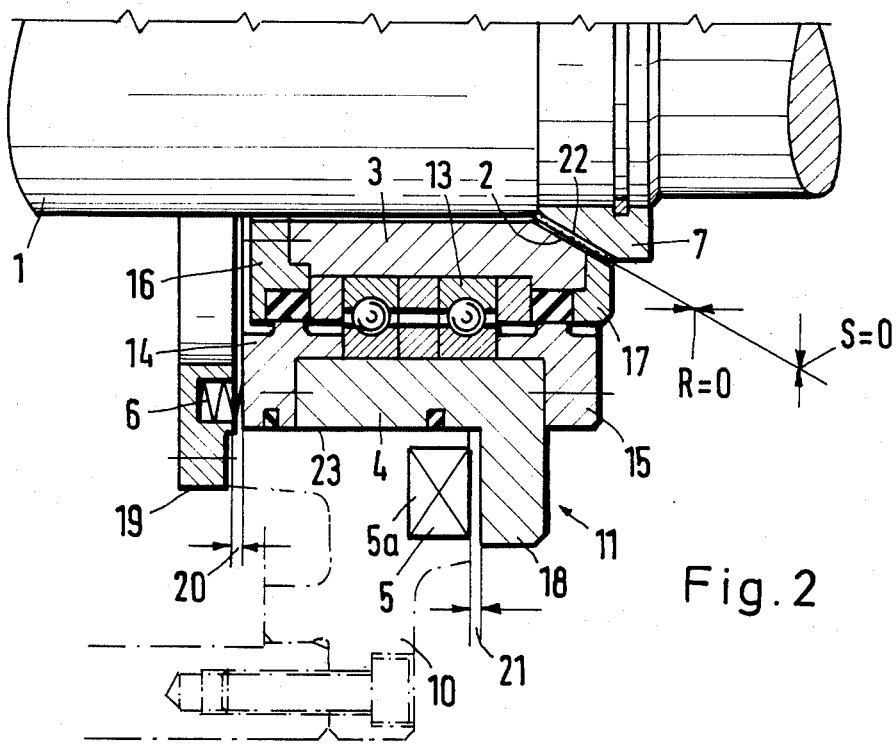
FIG. 2 shows the device according to FIG. 1 in the active state, in which the bearing sleeve engages the collar.

FIG. 2 shows the centering and safety device 11 in its active position, in which the electro magnet ring 5 or magnets are de-energized, and consequently, the centering and safety device 11 is pushed by the springs 6 with its centering and bearing surface 2 against the matching conical surface 22 of the centering collar 7 of the rotor, so that the gaps "S" and "R" become zero. On the other hand, a gap 20 (FIG. 2) has now been created between the plate 19 and the device 11 and a gap 21 (FIG. 2) between the electromagnet ring 5 and the flange 18. The conical centering and bearing surface 2 of the bearing sleeve 3 and the conical surface 22 of the centering and bearing collar 7 may advantageously be equipped with suitable friction coatings 2a and 22a, respectively. The electro magnet ring 5 or magnets are electrically connected to the bearing electro magnets 60, 61 of the contactless rotor bearings, via the electrical connections 62, 63, and via connections 64, 65 to a suitable electric d-c-power source, not shown. The bearing electro magnets 60, 61 and the electromagnet ring 5 are shown parallel connected, but may alternatively be series connected. It follows, that if the electric power source fails, all magnets, the bearing electro magnets 60, 61 as well as the electromagnet ring 5 all loose power simultaneously, and if that happens, the safety and centering device 11 therefore, due to such an operational disorder, the bearing electro magnets 60, 61 of the rotor shaft 1 are without current and thereby lose their effectiveness as bearings, the electromagnet ring 5 also lose their current and bearing effect simultaneously, so that the centering and safety device 11 is shifted from the inactive position in FIG. 1 into the active position in FIG. 2 by the springs 6. The running imbalance of the rotor caused by the loss of carrying capacity of the bearing air gap if the rotor bearings in a power failure is therefore avoided due to the almost instantaneous engagement by the contact between the bearing sleeve and 3 and the centering and bearing collar 7, i.e. the rotor is centered and supported at the conical centering and bearing surfaces 2 and the conical surface 22. Thereby, damage to the bearings of the rotor and to the rotor itself is prevented.

As soon as the current supply is restored, the bearing electro magnets 60, 61 of the rotor bearings and thereby also the electro magnet ring 5 of the centering and safety device 22 become active again; i.e. the bearing gaps of the rotor bearings become load-supporting again and the device 22 is pulled to the left again by the force of the electromagnet ring 5 into its inactive position shown in FIG. 1. Thereby, the area contact of the conical centering and bearing surfaces 2 and the conical surface 22 is interrupted and the gaps "S" and "R" between the rotor centering and bearing collar 7 and the bearing sleeve 3 are restored.

Figure 6:
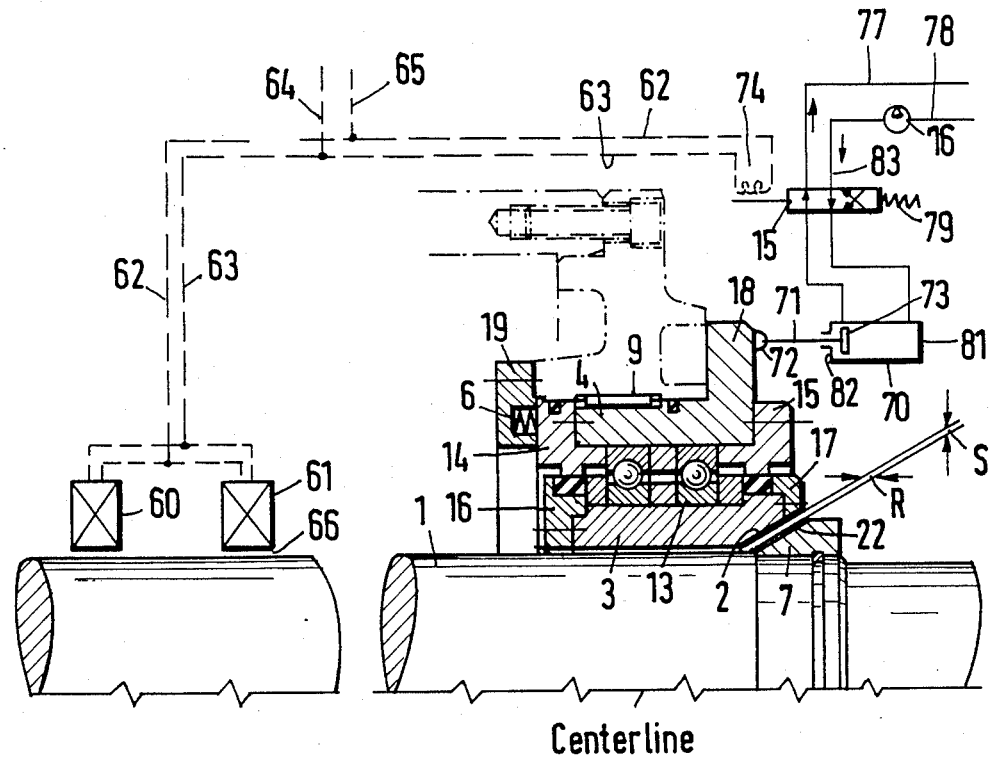
FIG. 6 is a schematic reprentation of a hydraulic or pneumatic operating arrangement for the centering and safety device.

Instead of the release by the electromagnet ring 5, the axial motion of the bearing sleeve 3 can also be caused, according to a further embodiment, by a pneumatic or hydraulic cylinder/piston unit via an electrical signal conversion, as shown in FIG. 6.

In FIG. 6 the electromagnet ring 5 has been replaced by a fluid pressure control hydraulic or pneumatic cylinder 70, having an active and inactive value position, in which a piston 73 is connected via piston rod 71 to the sliding sleeve 4 at attachment point 72 to the sliding sleeve 4. A hydraulic or pneumatic valve 75 is controlled by a solenoid 74 which is parallel connected with the bearing electromagnets 60, 61 via leads 62, 63. In the energized condition of the solenoid 74, the valve spool is drawn to the right position, as shown, in which fluid is drawn from the inlet 78 by the pump 76 through the pipe 83 and through the valve to the cap end 81 of the cylinder 70 which drives the piston 73 to the left position, in which the sliding sleeve is disengaged from the centering and bearing collar 7. If electric power is lost at leads 64, 65, the solenoid 74 is deactivated and the valve spool spring 79 draws the spool to the left, in which position fluid pressure is applied to the rod end 82 of the cylinder 70, which pushes the piston 73 to the right which draws the sliding sleeve 4 to the right into engagement with the collar centering and bearing 7 so that the rotor is centered. When the piston 73 is moved, fluid escapes through the fluid outlet 77. The centering and safety device is shown in FIG. 3 for a vertically arranged rotor shaft 50 which comprises a centering sleeve 52 which is rotatably supported in metallic ball or sliding bearings 51 and may be provided with an internal cone at both end faces (or only at one end face). The centering sleeve 52 and the bearing and centering collars 54 and 56 are equipped with suitably matched pairs of friction surfaces 59.

In normal operation, the rotor's electro magnetic bearings, which are not shown, but are similar to the bearing electromagnets 60, 61 shown in FIGS. 4 and 6, with the exception that they are disposed vertically one above the other, keep the rotor shaft 50 suspended in an upper position, which is the position shown in FIG. 3. In case of power failure the rotor, with its shaft 50 drops; and the centering sleeve 52 engages with its internal cone friction surface 59 the bearing and centering collar 54 which is provided with a corresponding external cone and is fastened to the rotor shaft 50. In normal operation, there is a radial air gap "U" and a vertical gap "V" between the bearing and centering collar 54 and the centering sleeve 52.

By means of a spacer ring 58, the vertical position of the centering sleeve 52 and the rotor shaft 50 can be adjusted so that smaller air gaps "V" are provided between the conical bearing and centering surface then the gaps of the bearings of the rotor when it is in normal operation. If, on the other hand, due to a power failure the bearing electro magnets of the rotor bearings lose their current and therefore, their lifting capacity, the rotor shaft 50 with its bearing and centering collar 54 comes into contact with the centering sleeve 52 due to its own weight, whereby centering and at the same time, support of the rotor in the sleeve 52 takes place.

If simultaneously with the power failure, an upward thrust takes place which counteracts the rotor weight, the centering and the support take place between the bearing and centering collar 56 and the centering sleeve 52. As soon as the disturbance is corrected, the rotor is lifted off the conical support and centering surfaces and returns to its normal running position.

We claim:

1. Centering and safety device for a rotor with a shaft supported by contactless bearings having bearing electro magnets, the device which comprises:
   a centering and bearing collar with a first conical surface attached coaxially to the rotor shaft with the conical surface facing axially in a first direction,
   a bearing sleeve disposed coaxially with the rotor shaft having a second conical centering and bearing surface facing said first conical surface, a sliding sleeve supported axially slidable in a stationary housing between an inactive position distal to said centering and bearing collar and an active position proximal to said centering and bearing collar, having an annular flange,
   a metallic bearing interposed between said sliding sleeve and said bearing sleeve,
   at least one electromagnet ring rigidly attached to said housing, said electromagnet ring electrically connected with said bearing electro magnets, and magnetically attracting said flange and drawing it axially into said inactive posisiton when said electromagnet ring is electrically energized, thereby creating in the inactive position a radial and an axial airgap between the second centering and bearing surface and the first conical surface,
   at least one spring interposed between said housing and said sliding sleeve, said spring for urging said sliding sleeve into said active position, in which said first and second conical surfaces engage one another when said bearing electromagnets and said electromagnet ring are de-energized, so that radial and axial air gaps become zero.

2. Device according to claim 1 wherein said first and second conical surfaces are annular, conical surfaces disposed concentrically with said rotor shaft.

3. Device according to claim 1, wherein said spring imparts a quickly acting axial motion to said sliding sleeve when said electromagnet is de-energized.

4. Device according to claim 3 wherein the force exerted by said spring and the magnet force exerted by said electromagnet ring are mutually opposing forces.

5. Device according to claim 1 wherein said bearing electromagnets and said electromagnet ring are electrically in parallel connection.

6. Device according to claim 1 wherein said metallic bearing is a ball bearing.

7. Centering and safety device according to claim 1, wherein said first conical bearing and centering surface and said second conical surface are equipped with friction coating.

8. Centering and safety device for a rotor with shaft supported by contactless bearings having bearing electromagnets, the device which comprises:
   a centering and bearing collar with a first friction surface attached coaxially to the rotor shaft with the friction surface facing axially in a downward direction,
   a bearing sleeve disposed coaxially with the rotor shaft having a second friction surface facing said first friction surface,
   a stationary sleeve,
   a metallic bearing interposed between said stationary sleeve and said bearing sleeve,
   said first and said second friction surfaces engaging one another when said bearing electromagnets are de-energized and said rotor looses its bearing support.

9. Centering and safety device for a rotor with a shaft supported by contactless bearings having bearing electro magnets, the device which comprises:
   a centering and bearing collar with a first conical surface attached coaxially to the rotor shaft with the conical surface facing axially in a first direction,
   a bearing sleeve disposed coaxially with the rotor shaft having a second conical surface facing said first conical surface,
   a sliding sleeve supported axially slidable in a stationary housing between an inactive position distal to said bearing and centering collar and an active position proximal to said bearing and centering collar, thereby creating in the inactive position a radial and an axial airgap between said centering and bearing surface and said conical surface, said airgap becoming zero in the active position,
   a metallic bearing interposed between said sliding sleeve and said bearing sleeve,
   a fluid pressure responsive cylinder having a piston slidable in said cylinder between an active and an inactive piston position and mechanically linked to said sliding sleeve,
   a fluid pressure control valve having an active and an inactive valve position for moving said piston between said active and said inactive piston position, respectively, and a solenoid electrically connected with said bearing electro magnets for moving said control valve to said inactive position when said solenoid is energized, and
   a spring for having said valve move to said active valve position when said solenoid is de-energized,
   means for connecting a source of fluid pressure to said control valve.

10. Centering and safety device according to claim 9, wherein said first conical bearing and centering surface and said second conical surface are equipped with friction coating.

* * * * *